US005264697A

United States Patent [19]

Nakagawa et al.

[11] Patent Number: 5,264,697

[45] Date of Patent: Nov. 23, 1993

[54] FOURIER TRANSFORM MASS SPECTROMETER

[75] Inventors: Kazuo Nakagawa; Hiromi Yamazaki; Yasushi Takakuwa, all of Tokyo, Japan

[73] Assignee: Nikkiso Company Limited, Tokyo, Japan

[21] Appl. No.: 910,179

[22] PCT Filed: Nov. 19, 1991

[86] PCT No.: PCT/JP91/01581

§ 371 Date: Jul. 16, 1992

§ 102(e) Date: Jul. 16, 1992

[87] PCT Pub. No.: WO92/09097

PCT Pub. Date: May 29, 1992

[30] Foreign Application Priority Data

Nov. 19, 1990 [JP] Japan .................................. 2-313336

[51] Int. Cl.$^5$ .............................................. B01D 59/44

[52] U.S. Cl. .................................... 250/291; 250/290; 250/281

[58] Field of Search ................ 250/291, 290, 281, 282

[56] References Cited

U.S. PATENT DOCUMENTS

| | | | |
|---|---|---|---|
| 2,808,516 | 10/1957 | Lanneau | 250/291 |
| 3,530,371 | 9/1970 | Nelson et al. | 250/291 |
| 3,742,212 | 6/1973 | McIver, Jr. | 250/291 |
| 3,937,955 | 2/1976 | Comisarow et al. | 250/283 |
| 4,500,782 | 2/1985 | Allemann et al. | 250/291 |
| 4,761,545 | 8/1988 | Marshall et al. | 250/291 |
| 4,933,547 | 6/1990 | Cody, Jr. | 250/282 |

FOREIGN PATENT DOCUMENTS

| | | |
|---|---|---|
| 58-38847 | 3/1983 | Japan . |
| 59-4829 | 2/1984 | Japan . |
| 2-301952 | 12/1990 | Japan . |

OTHER PUBLICATIONS

E. B. Ledford, Jr. et al., "Exact Mass Measurement by Fourier Transform Mass Spectrometry," *Anal. Chem.*, vol. 52, pp. 463-468, 1980.

*Primary Examiner*—Paul M. Dzierzynski
*Assistant Examiner*—Kiet T. Nguyen
*Attorney, Agent, or Firm*—Browdy and Neimark

[57] ABSTRACT

The present invention relates to a Fourier transform mass spectrometer suitable for analysis of a particular component of a sample gas made of known components, which is adapted so as to prevent the high-frequency electric field applied to the high vacuum cell from deviating due to a variation in the long cycle of the static magnetic field applied to the high vacuum cell, which is characterized in that the variation in the long cycle of the magnetic field applied is detected as a deviation in the ion cyclotron resonance frequency of the particular component and the high frequency for forming the high-frequency electric field is made variable in accordance with the variation in the ion cyclotron resonance frequency.

5 Claims, 4 Drawing Sheets

FOURIER TRANSFORM MASS SPECTROMETER

TECHNICAL FIELD

The present invention relates to a Fourier transform mass spectrometer and, more particularly, to a Fourier transform mass spectrometer suitable generally for concentration analysis of any mixed gas samples including a so-called process analysis for process stream in chemical plants, a so-called medical gas analysis for carrying out analysis of metabolic functions and anesthetic states or monitoring them by analyzing respiratory gases or inhalation gases from or into the living body, a so-called evolved gases analysis for analyzing evolved gases for estimating the state of a surface of a semiconductor, a catalyst or the like or the progress of a reaction thereof from a gaseous component eliminating therefrom by heating them, or so on.

BACKGROUND ART

Heretofore, in many occasions, Fourier transform mass sepectrometers are adapted mainly for general organic analysis in order to identify an unknown component. Hence, a transmission unit supplying high-frequency electric field, mounted to the Fourier transform mass spectrometer, for forming an electric field for ionizing a gaseous sample has the function for sweeping a whole region of resonant frequency corresponding to a whole region of mass to be measured at a high speed so as to excite all kinds of ions.

Fourier transform mass spectrometer in the above mentioned field, however, it is said rather less often that an unknown component is required to be identified, but it is required in many occasions that the concentration of the particular known components in a mixed gas sample, to be analyzed is required and its temporal drift. In order to achieve such an object, a so-called calibration curve technique is adopted with the attempt to determine the concentration of a certain sample. In other words, a standard gas composed of known concentrations of the components is prepared for a gas components to be measured, and the relationships between the concentrations and an intensities of a spectral peaks measured are determined in advance. At the time of measurement, the concentration of a particular known component of the sample gas is corrected from the spectral peak intensity of the sample gas with reference to the relationships determined in advance. Hence, the necessary condition of accurate analysis is based on the fact that the peak to be measured is not superimposed whatsoever on any peak other than the component to be measured.

When the conventional Fourier transform mass spectrometers are employed in the field as described hereinabove, the conventional transmission unit excites ions which are not required for excitement, so that voltage of a signal to be induced into a receiving electrode of an analyzing cell amounts to a total sum of outputs caused by resonance from all the ions containing the unnecessary ions. As a consequence, an intensity of an ion cyclotron resonance signal of the ion to be induced is so restricted as not to exceed a dynamic range of analog-digital conversion, so that the ion to be measured cannot be excited until the ion cyclotron resonance signal of the ion to be measured becomes to a sufficiently high level.

Next, the conventional Fourier transform mass sepctrometer presents the problem that there is no correlation between a static magnetic field and the frequency to be irradiated. In other words, if a permanent magnet, an electric magnet or the like is employed, not a superconductive magnet, application of the static magnetic field for a long term causes the irradiating frequency to deviate from the resonant magnetic field, thereby making the desired ion difficult to be excited.

Therefore, the object of the present invention is to provide a Fourier transform mass spectrometer which can solve the problems as described hereinabove and which is capable of making a ratio of the static magnetic field to the irradiating frequency constant so that an ion to be measured can be excited until a resonant signal of the ion becomes sufficiently high.

Another object of the present invention is to provide a compact Fourier transform mass spectrometer capable of mass analysis of a particular kind of ion to be measured in a stable manner for a long term.

DISCLOSURE OF INVENTION

The present invention with the object to solve the aforesaid problems is directed to a Fourier transform mass spectrometer comprising ionizing a sample gas introduced into a high vacuum cell disposed in static magnetic field; applying high frequency electric field to the ion by applying the high frequency to a pair of irradiating electrodes disposed in the high vacuum cell; inducing an ion cyclotron resonance resulting from the ion of a particular component to be measured; detecting the resulting ion cyclotron resonance as a high-frequency decaying electric signal for decaying the high frequency; converting the high-frequency decaying electric signal into a digital signal; and converting the digitized high-frequency decaying electric signal time-domain signal into a frequency-domain signal, which is characterized by a permanent magnet or an electric magnet for applied static magnetic field, high-frequency transmitting means for reading out a wave form of a digital high-frequency electric field stored in advance in a memory and transmitting an analog wave form subjected to D/A conversion to the irradiating electrode pair, by means of a clock pulse to be generated from a clock pulse generator, and feedback means for detecting a variation of the applied magnetic field for a long term as a deviation in an ion cyclotron resonance frequency of the particular component and for making the frequency of the clock pulse for D/A converter variable in accordance with the deviation in the ion cyclotron resonance frequency, so as to hold a ratio of the static magnetic field to the frequency of the high-frequency electric field at a substantially constant.

A description will now be made of the action of the Fourier transform mass spectrometer having the composition as described hereinabove.

For the Fourier transform mass spectrometer according to ,the present invention, the ion cyclotron resonance frequency for a residual component left present in high vacuum circumstances, such as hydrogen or nitrogen, is measured in advance, and the ion cyclotron resonance frequency measured is stored as a reference frequency. Alternatively, an ion cyclotron resonance frequency of a particular gaseous component that does not interfere with the object of measurement, such as argon or the like, is measured in advance and this ion cyclotron resonance frequency is stored as a reference frequency.

In measuring the ion cyclotron resonance frequency, the mass number of the ion at the time of ionization of the particular component serving as the object of measurement is inputted, and the ion cyclotron resonance frequency of the particular ion is computed and determined on the basis of the mass number of the particular ion and the reference frequency stored in advance in the memory. The resulting ion cyclotron resonance frequency is then stored.

Thereafter, the sample gas as the object of measurement is introduced into the high vacuum cell of which the pressure has been reduced to a high degree of vacuum. To the sample gas ionized in the high vacuum cell is applied the static magnetic field caused to occur by means of magnetic field occurring means such as the permanent magnet or the electric magnet.

Further, high frequency is applied to the pair of the irradiating electrodes disposed within the high vacuum cell from the high-frequency transmitting means, thereby applying, the high-frequency electric field to the ions present in the high vacuum cell.

The application of the high-frequency electric field may be made in a manner as will be described hereinafter. The ion cyclotron resonance frequency stored in the memory is read out by the clock pulse generated from the clock pulse generator, and it is subjected to D/A conversion, followed by application to the pair of the irradiating electrodes. This allows the ions as the object of measurement to be applied to by the static magnetic field from the permanent magnet or the electric magnet as well as the high-frequency electric field of the particular frequency, thereby inducing an ion cyclotron resonance signal of the particular ion.

The ion cyclotron resonance signal induced is then detected as a high-frequency decaying electric signal.

The high-frequency decaying electric signal is converted into a digital signal by means a high-speed A/D converter. The high-frequency decaying electric signal is called the time-domain signal.

The high-frequency decaying electric signal in the digital form is converted into the frequency-domain signal by the technique of Fourier transformation. The frequency-domain signal corresponds to a mass spectrum and the unit of the signal frequency can be readily converted to thereby give a usual mass number because there is the relationship between the frequency and the mass number as shown in the formula (2) as will be described hereinafter.

In accordance with the present invention, the irradiating frequency close to the ion cyclotron resonance frequency of the particular ion to be measured is applied to the pair of the irradiating electrodes, so that the particular ion to be measured can be excited to such a sufficiently high level as being measurable within a limited dynamic range in converting the detected high-frequency decaying signal into the corresponding digital signal. The Fourier transform mass spectrometer can continuously detect the particular ion as the object of measurement within the sample gas in a continuous manner by supplying the sample gas to the high vacuum cell continiously or periodically.

It is to be noted, however, that in instances where the permanent magnet or the electric magnet is employed for forming the static magnetic field for the Fourier transform mass spectrometry, gradual changes in the static magnetic field due to temperature or the like cannot be avoided if the Fourier transform mass spectrometer is operated for a long term. Hence, if the analysis would last for a long term, the extent to which the time variation or the drift of the static magnetic field may amount to as substantially level as $10^{-3}$ or more, thereby leading to a decrease in the efficiency of irradiating the ion and making accurate detection of the particular ion to be measured impossible.

Hence, in accordance with the present invention, the drift of the static magnetic field is detected as a deviation in the ion cyclotron resonance frequency, and the frequency of the reading clock pulse corresponding , to the varied ion cyclotron resonance frequency is determined, thereby feeding back the frequency deviation to the clock pulse generator.

The clock pulse generator changes the frequency of the reading clock pulse according to the feedback signal.

The wave form for irradiation frequency stored in the memory is read out by the clock pulse having its frequency changed and subjecting the resulting ion cyclotron resonance frequency to D/A conversion, followed by applying the resulting signal to the pair of the irradiating electrodes.

As described hereinabove, the Fourier transform mass spectrometer according to the present invention can detect the drift of the static magnetic field as a deviation in the ion cyclotron resonance frequency, even if the static magnetic field would change for a long term, change the frequency of the reading clock pulse in accordance with the changes in the ion cyclotron resonance frequency, convert the read high frequency wave form to analog signal, and apply the resulting analog signal to the pair of the irradiating electrodes, so that the Fourier transform mass spectrometer can be arranged so as to hold the ratio of the static magnetic field to the frequency of the high-frequency electric field constant relative to a change in the temperature of the environment encountered with the room where the Fourier transform mass spectrometer is disposed or with the spectrometer.

BEST MODE FOR CARRYING OUT THE INVENTION

An embodiment according to the present invention will be described more in detail.

Figure 1:
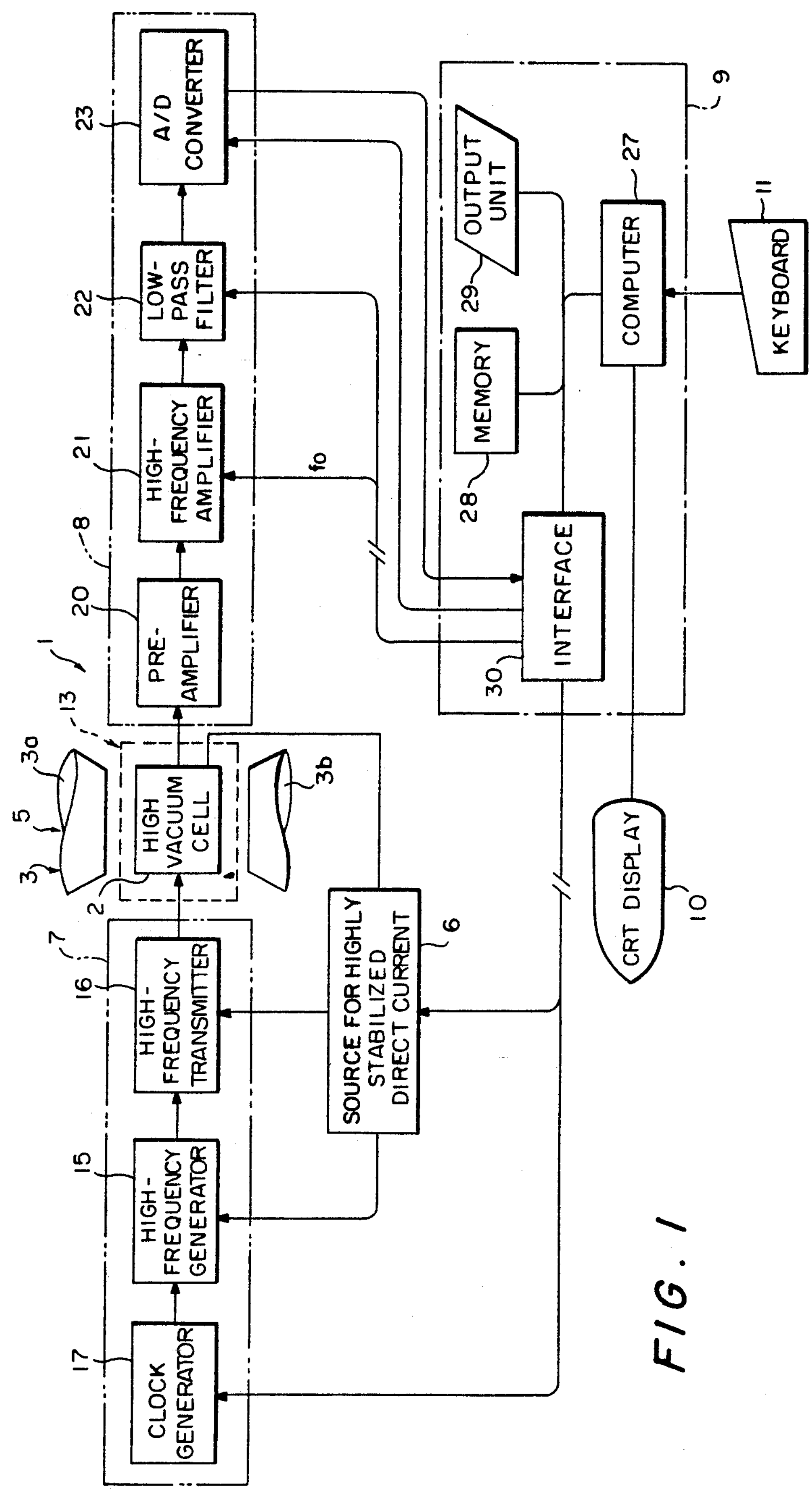
FIG. 1 is a block diagram showing an spectrometer according to an embodiment of the present invention.

A Fourier transform mass spectrometer 1 as shown in FIG. 1 comprises a high vacuum cell 2 into which a sample gas is introduced and ionized, magnetic field generating means 5 using a permanent magnet 3 for forming static magnetic field for the sample gas within the high vacuum cell 2, a high frequency source 7 for providing the particular ions present in the high vacuum cell 2 as the object of measurement with high-frequency electric field from a plurality of fixed frequencies for exciting ion cyclotron resonance, detection means 8 for detecting the ion cyclotron resonance excited within the high vacuum cell 2 as a high-frequency decaying signal, operation controlling means 9 for controlling the ratio of the static magnetic field to the frequency at a constant by converting the high-frequency decaying signal to a frequency-domain signal determining a drift of the applied magnetic field for a long term by the magnetic field generating means 5 as a deviation in an ion cyclotron resonance frequency for the particular ion, and subjecting the extent of the deviation in the ion cyclotron resonance frequency to feedback to the high frequency source 7, a pulse controlling circuit 6 for controlling emission, such as controlling a voltage of each electrode in the high vacuum cell 2 and a potential of a filament for emitting thermal electrons for performing the function of ionization to be implemented by transmitting electron beams to molecules of the sample gas introduced into the high vacuum cell 2, the function of blocking the transmission of the electron beams during a period during which high-frequency pulse is being applied and the resonance signal is being measured, and the function of quenching the residual ion at the time of ending the measurement, and for controlling the high frequency source 7 by generating a pulse series necessary in response to an instruction from the operation controlling means 9 through an interface, as well as a keyboard 11 and a CRT display 10, each connected to the operation controlling means 9.

It is noted herein that the long term drift of the magnetic field applied from the magnetic field generating means 5 can be determined as the change of the ion cyclotron resonance frequency for the particular ion for reasons as will be described hereinafter. The cyclotron resonance frequency of the ion is determined in proportion to the static magnetic field substantially. Hence, if the field applied varies for a long term, the ion cyclotron resonance frequency varies, too, in proportion to the long term variation in the magnetic field applied. Therefore, the long-term variation of the magnetic field applied for a certain period of time can be determined by continuously monitoring the ion cyclotron resonance frequency of the particular ion.

The high vacuum cell 2 is protected with a very high vacuum chamber 13 and accommodated in a thermostat vessel, although not shown. In other words, the high vacuum cell 2 is disposed in the very high vacuum chamber 13 and the inside of the very high vacuum chamber 13 is maintained at a high vacuum level as in the high vacuum cell 2. Further, by accommodating them in the thermostat vessel, the inside of the high vacuum cell 2 is always maintained at a constant temperature.

As the high vacuum cell 2, there may be employed a hexahedral or cubic cell comprising three pairs of electrodes one of which is disposed in the direction perpendicular to the direction of magnetic field generated by the magnetic field generating means 5, two pairs of electrodes, one pair for irradiating and the other for receiver, disposed in the position parallel to the magnetic field and perpendicular to each other.

Such a hexahedral or cubic cell may include, for example, conventional one as described, for example, in R. T. McIver Jr.: Rev. Sci. Instrum., 41, 555 (1970); M. B. Comisarow: "Cubic Trapped Ion Cell For Ion Cyclotron Resonance", Int. J. Mass Spect. Ion Phys., 37(1981), p. 251, and the like.

Figure 2:
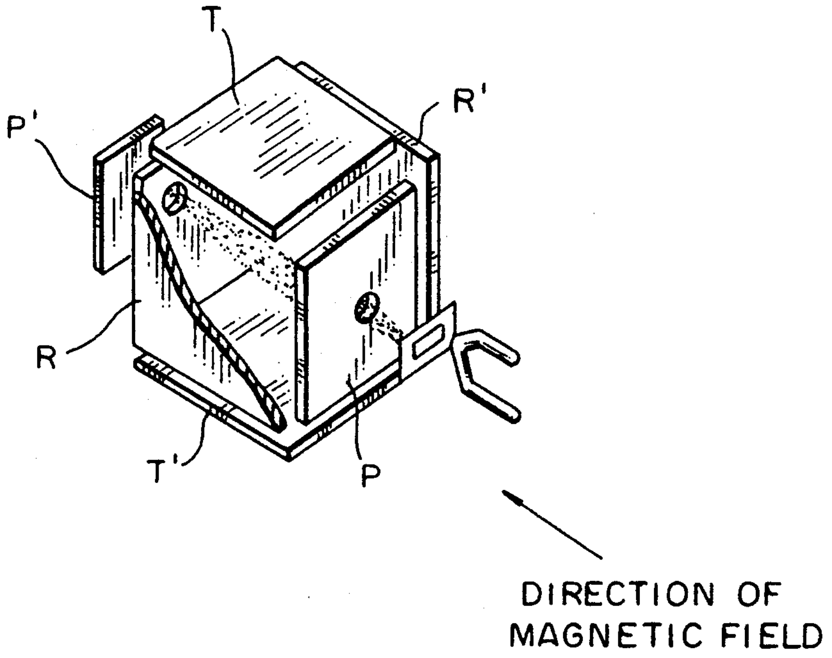
FIG. 2 is a schematic representation describing a cubic cell.

As shown in FIG. 2, a pair of the electrodes P and P', which makes the hexahedral cell in such a manner as to be perpendicular to the direction of the magnetic field generated by the magnetic field generating means 5, are provided with a slight strength of positive potential, for example, from 1 V to 2 V, in order to prevent the ions drit along the direction of the magnetic field, within the high vacuum cell 2. The irradiating electrodes T and T' are interposed between the pair of the electrodes P and P' so as to face them along the direction of the magnetic field, thereby allowing the high-frequency signal for exciting the ions generated in the hexahedral or cubic cell to cause the cyclotron resonance for a period of time, for example, as short as 0.1 ms to 10 ms. Further, the receiving electrodes R and R' are disposed so as to face along the direction of the magnetic field and to be perpendicular to the electrodes P and P' as well as the irradiating electrodes T and T', thereby receiving the voltage of the high-frequency signal to be induced by the resonance.

It is to be noted herein that the thermostat vessel is so arranged as to allow the magnetic field generating means 5 to maintain changes in its temperatures within, for example, 0.1° C. or less, relative to the ambient temperature, thereby alleviating the drift of the magnetic field due to the changes of the ambient temperatures. When the Fourier transform mass spectromer is employed for the process analysis, the ambient temperature may change in the range of from 10° C. to 30° C. or more over the length of several months. Hence, when it is required that the drift due to such excessive changes in temperatures should be reduced and the ratio of the magnetic field to the frequency of the high-frequency electric field should be adjusted so as to be held within an appropriate range, the use of the thermostat vessel can offer the effect.

The permanent magnet 3 to be employed as the magnetic field generating means 5 comprises a pair of magnetic pole pieces 3*a* and 3*b*, each being disposed so as to face the high vacuum cell 2.

The use of the permanent magnet 3 offers one of the features for the present invention.

When a superconductive magnet is employed, heat can be shielded thermally by liquid helium so that the magnetic field can be stabilized to the almost extent, and the resulting mass spectrum is not adversely affected by changes of temperature and time. It can be noted, however, that the magnetic field caused by the permanent magnet 3 and the electric magnet changes due to the influence of the ambient temperature as well as that a coefficient of temperature may be from approximately $-2\times10^{-4}$/°C. for the electric magnet and it may range from $-5\times10^{-4}$ to $-6\times10^{-3}$/°C. for a permanent magnet made of a rare earth and iron. In order to ensure the spectral resolution in the range of from $10^4$ to $10^5$, it is required to compete with a variation in the magnetic field to be caused by the temperature or the like.

It is thus to be noted herein that, when the permanent magnet 3 is employed for the apparatus according to this embodiment of the present invention, compensation by means of a special magnetic shunt steel, what is called thermoperm, may appropriately be adopted as means for compensating the coefficient of temperature. This compensation can improve the coefficient of temperature to degrees higher by several times. For example, a neodimium-iron-boron type bond magnet ($Nd_2Fe_{14}B$) has an improved coefficient of temperature up to $\pm1\times10^{-3}$/°C. at the present time.

The high frequency source 7 comprises a clock pulse generator 17 for generating clock pulse signals having a predetermined cycle, a high frequency generator 15 as will be described hereinafter in more detail, and a high frequency transmitter 16 for transmitting the high frequency generated by the high frequency generator 15 to the irradiating electrodes.

The detection means 8 comprises a pre-amplifier 20, a high-frequency amplifier 21, a low-pass filter 22 and a high-speed processable A/D converter 23.

The pre-amplifier 20 is adapted to amplify the ion cyclotron resonance frequency induced by the receiving electrode R and R' disposed in the high vacuum cell 2 and transmit the amplified ion cyclotron resonance signal to the high-frequency amplifier 21. As the pre-amplifier 20, there may be employed a so-called narrow band-width amplifier having a narrow range of pass band frequencies relative to the central frequency so as to allow the ion cyclotron resonance frequency for the particular ion as the object of analysis to be amplified selectively.

The high-frequency amplifier 21 is adapted to subject the ion cyclotron resonance signal amplified in a narrow pass band and a reference signal of frequency fo entered separately to mixed processing, thereby converting the ion cyclotron resonance signal into a low-frequency signal, that is, difference frequency signal between the resonance and reference frequencies and transmitting the low-frequency signal to the low-pass filter 22.

The conversion of the frequencies is carried out by holding information on the amplification and the phase of signal waves and converting only the frequency into the difference frequency between the resonance and the reference frequencies from the reference frequency. The reference frequency fo is preferably set to be higher than the ion cyclotron resonance frequency.

The low-pass filter 22 is adapted so as to eliminate folding over signals at the time of the A/D conversion by the A/D converter 23, and the cut off frequency is set in advance to be lower by a half times, or less, comparing with the clock frequency of the A/D converter 23.

The A/D converter 23 converts the resonance signals, which are eliminated unnecessary frequency signals and amplified to the signal level to such an extent as being convertible, to the digital signals corresponding to the resonance signals, followed by generating the resulting digital signal to the operation controlling means 9.

The operation controlling means 9 comprises a computer 27 for implementing control over the whole system, a memory 28 as storage means, an output unit 29, and an interface 30 for controlling the A/D converter 23 as well as receiving outputs from the A/D converter at a high speed and .transmitting a control signal from the computer 27 to the source 6 for highly stabilized direct current and to the high-frequency generator 15.

Figure 3:
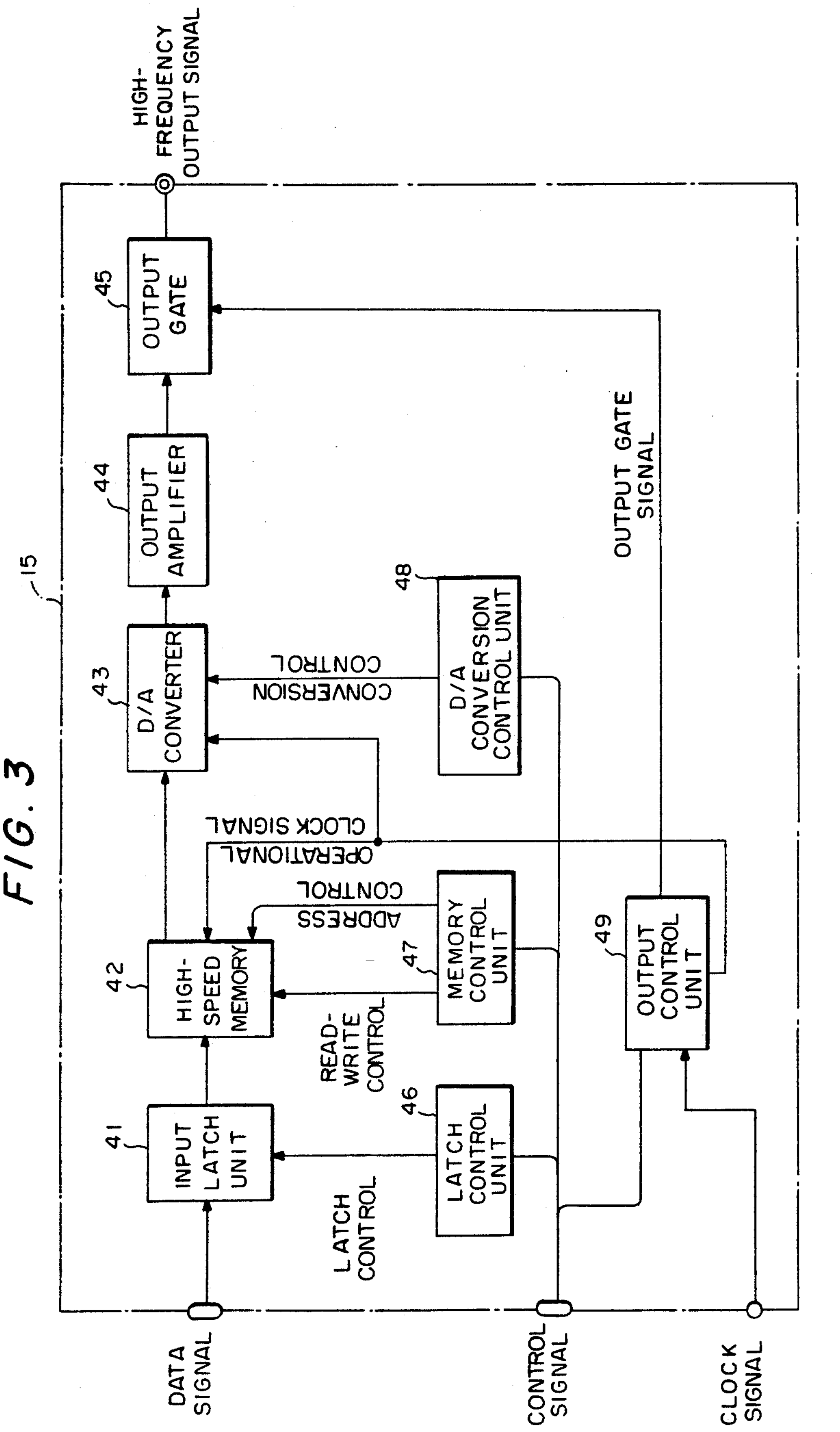
FIG. 3 is a block diagram showing a generator for generating a signal to be transmitted, mounted to the Fourier transform mass spectrometer according to the present invention.

The high-frequency generator 15 will now be described in more detail with reference to FIG. 3.

The high-frequency generator 15 comprises an input latch unit 41 for latching the digital signal entered from the operation controlling means 9, the digital signal being data in the form of a high-frequency wave necessary for exciting the ion cyclotron computed by the operation controlling means 9 on the basis of the formula (1) or (2) as will be described hereinafter, a high-speed memory 42 for storing the data signal in the high-frequency wave form entered from the input latch unit 41, a D/A converter 43 for converting a data signal from the high-speed memory 42 into analog signals, an output amplifier 44 for amplifying the output from the D/A converter 43 and generating the signal as a high-frequency output signal, an output gate 45 for switching the high-frequency output signal generated from the output amplifier 44 and sending the signal to the high-frequency transmitter 16, a latch control unit 46 for implementing latch control of the input latch unit 41, a memory controlling unit 47 for implementing read-write control and address control of the high-speed memory 42, a, D/A conversion controlling unit 48 for controlling the conversion for the D/A converter 43 by reading the data out from the operation controlling means 9 and receiving a control signal for a pulse series via a terminal for the control signal, and an output control unit 49 for transmitting an output gate signal for swiching the output gate 45. The output control unit 49 contains a gate circuit for controlling an operational clock signal for the high-speed memory 42 and the D/A converter 43 in response to input of the clock signal from the clock pulse generator 17. The high-frequency output signal to be generated from a terminal for the high-frequency output signal is generated to the high vacuum cell 2 through the high-frequency transmitter 16 as an excited high-frequency pulse required for causing the ion cyclotron resonance.

Next, the action of the Fourier transform mass spectrometer 1 having the aforesaid configuration will be described with reference to FIG. 4.

For the component as the object of measurement, only a molecular peak ion or a base peak ion is selected, and when an angular frequency $\omega_c$ for resonance is transmitted, a signal voltage E(V) is given from the formula (1) below:

$$E = A \times \sin(\omega t + \phi) \quad (1)$$

where
A is the amplitude (unit: V);
t is the time (unit: second); and
$\phi$ is the phase (unit: rad).

The value $\omega$ is given by the following formula (2) when the static magnetic field applied is represented by "B", the mass, of the ion as the object is represented by "m" and the electric charge is represented by:

$$\omega = B \times e/m \quad (2)$$

Where e is a change of ion.

It is to be noted, however, that the accurate measurement of the static magnetic field B is difficult in usual cases, so that the static magnetic field B can be established by measuring the resonance frequency of the particular component and computing the formula (2) above on the basis of the resonance frequency measured.

For instance, the resonance frequency of a nitrogen molecule, a hydrogen molecule and the like remaining in high vacuum atmosphere can be measured with ease. Hence, the angular frequency $\omega$ of resonance for the ion as the object of measurement having the angular frequency $\omega_o$ of resonance and the mass number (m/z) can be given by the formula (3) as follows:

$$\omega = [(m/z)_o/(m/z)] \times \omega_o \quad (3)$$

where
$(m/z)_o$ is the mass number of the particular ion; and $\omega_o$ is the angular frequency of its resonance.

It is to be noted herein that the mass number (m/z) is determined as a physical constant on the basis of the kind of ions and it is not difficult to give the mass number with high accuracy as high as five to seven digits as effective number because the value $\omega_o$ is the frequency of resonance to be measured.

When the ions as the object of measurement are plural (n kinds of ions), a signal to be transmitted in a wave form can ,be given by the formula (4) as follows:

$$e = A \times \sum_{i=1}^{n} \sin(\omega_i t + \phi i) \quad (4)$$

where $\omega_i$ is $(m/z)_o/(m/z)_i \times \omega_o$ (5)

It is thus possible in the embodiment of the apparatus according to the present invention to give the frequency $\omega_o$ of resonance for each of nitrogen or hydrogen in advance as a reference frequency and store it, for instance, in the storage 28 of the operation controlling means 9. The frequency of resonance for each of nitrogen or hydrogen may be measured, for instance, by reducing the pressure in the high vacuum cell to a high vacuum level without supplying the sample gas thereinto, ionizing the remaining nitrogen or hydrogen, and inducing the ion cyclotron resonance by means of the static magnetic field and the high-frequency electric field.

Thereafter, the mass number (m/z) of the ion as the object of measurement present in the sample gas is inputted through the keyboard 11. The operation controlling unit 9 reads out the reference frequency stored in the storage 28, computing the frequency of the ion as the object of measurement in accordance with the formula (3) above, and storing the resulting frequency in the high-speed memory 42. When there are plural kinds of ions as the object of measurement, the mass numbers of each kinds of ion is inputted through the keyboard 11, the wave form is computed in accordance with the formulas (4) and (5), followed by storing the resultant united wave form in the high-speed memory 42.

It is to be noted herein that, once the aforesaid operation is executed, data stored in the storage 28 is not erased even if the Fourier transform mass spectrometer would be turned off, and that the reference frequency $\omega_o$ for each of nitrogen on hydrogen is not necessarily required to be measured again in the manner as described hereinabove when the Fourier transform mass spectrometer is turned on again and raised after having turned it off and the data stored in the storage 28 can be employed as it is in an arbitrary manner.

In order to measure the sample gas, the sample gas is first introduced into the high vacuum cell, which has been exhausted to a high vacuum extent. The sample gas is then ionized upon irradiation of electron beams or the like upon the sample gas in the high vacuum cell.

To the ion generated is applied the static magnetic field generated by the permanent magnet. In measuring, the high-frequency electric field is first applied to the resulting ion.

The application of the high-frequency electric field may be implemented in the manner as will be described hereinafter.

The computer 27 is adapted to compute the waveform of the transmitting signal with respect to the time t in accordance with the formula (3) above or the formulas (4) and (5) above and the resulting signal is stored in the high-speed memory 42 through the input latch unit 41.

In the embodiment of the present invention, the data signal computed with accuracy in a 12-bit is transmitted on each 8 bits to a bus line so that the data signal is transmitted twice as a high order byte and a low order byte. Hence, each byte is temporarily stored (latched) and stored as two-byte data in the high-speed memory 42.

In analysis, the control signal for controlling the operation of each of these units and portions is generated from the computer 27.

In other words, the output from the input latch unit 41 is first brought into a state of high impedance, thereby isolating the bus line from the high-speed memory 42. The memory controlling unit 47 brings the high-speed memory 42 in a read state and an address of the reading data is specified. The computer 27 generates an output gate signal specified separately to the output controlling unit 49 which in turn decodes a code indicative of the start of measurement in the output gate signal. As the signal decoded is generated to the output gate 45, the output gate 45 is brought into an ON state. At this time, the computer 27 generates the control signal to the memory controlling unit 47, thereby allowing the data signal stored in the high-speed memory 42 to be read out by means of the clock pulse having a constant frequency to be generated from the clock pulse generator 17, and converting the resulting signal into the analog signal by the D/A converter 43, followed by the generation of the resultant analog signal to the high-frequency transmitter 16. The high-frequency transmitter 16 implements pulse modulation in response to the analog signal and supplies a two-phase high-frequency pulse of electric power strong enough to excite and send to the irradiating electrodes of the high vacuum cell 2.

In this embodiment according to the present invention, the Fourier transform mass spectrometer 1 for analyzing gases applies to the mass number of 200 [amu] or lower and employs a permanent magnet of approximately 0.6 [T] for the static magnetic field. Hence, a pulse of 16 MHz is employed for clock because the resonance frequency is approximately 4.8 kHz for hydrogen, approximately 345 kHz for nitrogen, and approximately 75.5 kHz for $^{129}Xe$. A D/A converter and a random-access memory, each being capable of being driven at this clock frequency can currently be commercially available. When the transmission time is set to 1 ms, the number of data to be stored is 16,000 and a memory size is 24,000 bytes.

Figure 4:
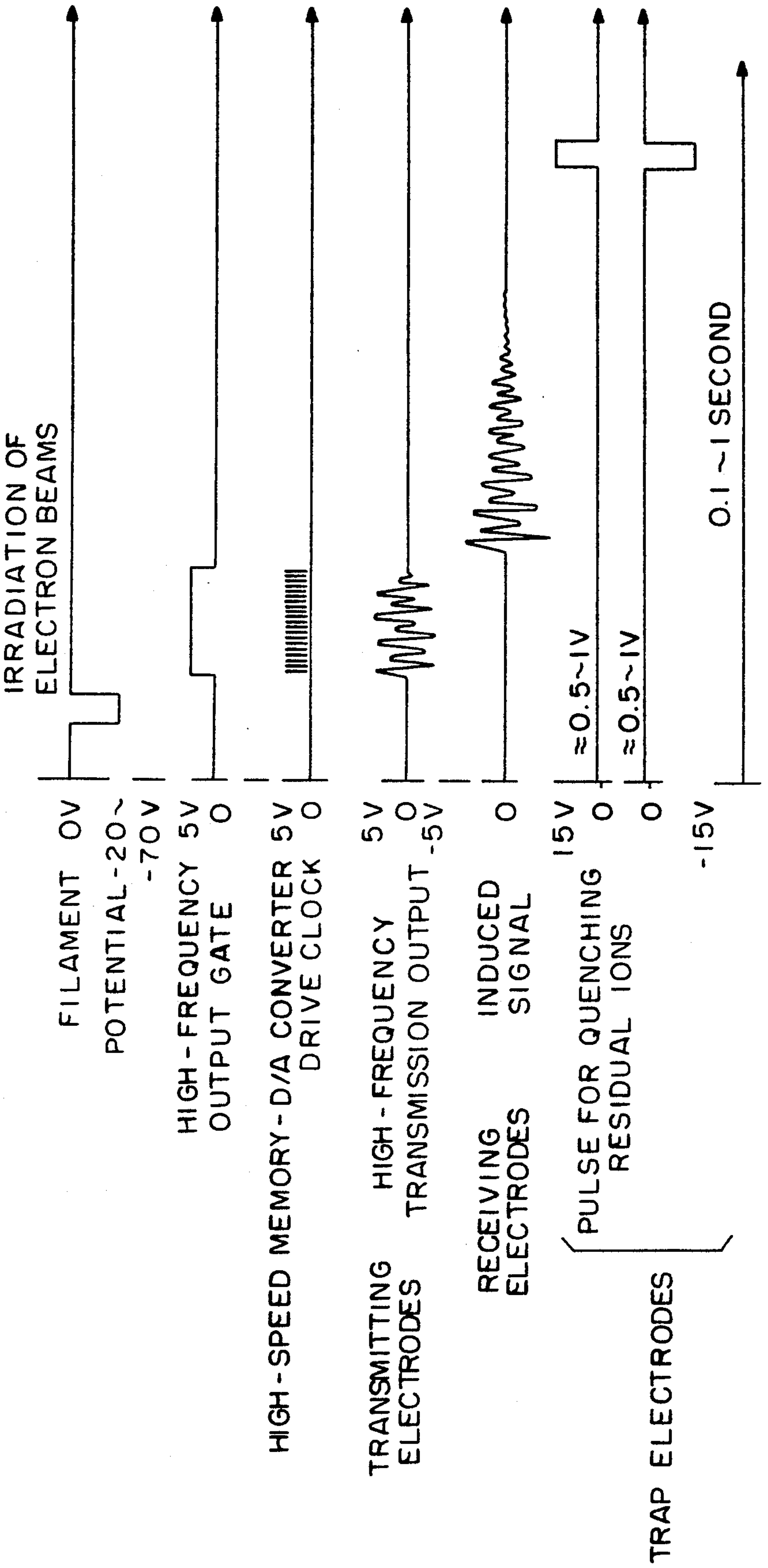
FIG. 4 is a diagram showing wave forms of signals to be transmitted from each section of the Fourier transform mass spectrometer according to the embodiment of the present invention.

FIG. 4 shows a typical relationship between the applied voltage of each electrode of the high vacuum cell 2 in a cycle of analysis and the signals induced. As shown in FIG. 4, (a) the filament potential is first switched to −20 to −70 [V], and the molecules of sample gases are ionized by electron beams irradiated into the cell.

(b) After the irradiation of the electron beams, the output gate of the high-frequency transmitter 16 is opened when a predetermined time elapses and (c) a clock for driving the memory storing the waveform signals is supplied concurrently, (d) then voltage for transmitting a signal for exciting the predetermined ion is applied to the irradiating electrodes by reading the high frequency stored in the high-speed memory on the basis of the computation results by the computer 27. After the excitement of the ion, the output gate is closed.

(e) In the manner as described hereinabove, the signal of the ion cyclotron resonance is induced on the receiving electrodes.

(f) After the measurement of the resonance signal, a pair of electrodes, that is, trapping electrodes, disposed in such a manner as crossing the magnetic axis at a right angle, are provided each with positive potential and negative potential, thereby quenching the ions remaining in the high vacuum cell 2.

In this embodiment according to the present invention, the high-frequency electric field having a fixed frequency is applied to the particular ion to be measured within the sample gas in the manner as described hereinabove, so that this embodiment can offer the feature that the ion to be measured can be excited to a great extent within the dynamic range of the D/A converter. Further, this embodiment has the great feature that the clock frequency for reading the transmitting waveform signal can be changed in accordance with the drift in the static magnetic field in repeating the cycles for excitement and measurement in the manner as described hereinabove, thereby holding the ratio of the magnetic field to the frequency in a constant fashion.

The resonance frequency f of the ion causing the cyclotron resonance in the static magnetic field and having the mass as indicated by "m" and the electric charge as indicated by "q" can be represented as follows from the formula (2) above:

$$f=qB/(2\pi m) \qquad (2)'$$

In other words, the frequency f is proportional to the static magnetic field B, while it is inversely proportional to the mass number.

If it is supposed that the static magnetic field B changes to kB due to the changes in the ambient temperature or the like, the resonance frequency changes to kf, too. It is defined herein that "k" is a proportion constant.

In this embodiment according to the present invention, the transmitting output wave form for exciting resonance is stored in the high-speed memory 42, so that the output frequency can be changed so as to become proportional to the frequency of the reading clock.

Hence, when a reference resonance frequency f(1) of a particular ion such as hydrogen ion or nitrogen ion is measured and stored in advance before the commencement of the measurement, a value given after the dirft in the static magnetic field can easily be given from the following formula (6) by measuring the resonance frequency f(1)' of the particular ion at the particular point of time:

$$k=f(1)/f(1)' \qquad (6)$$

At the time of commencing the measurement, if the frequency of the reading clock is measured as fck, the computer 27 gives an instruction to the clock pulse generator 17 so as to make the frequency satisfy the following relationship:

$$f=k\times fck.$$

When this operation is executed at every measurement or at constant time intervals, the measurement can be continued while retaining the ratio of the magnetic field to the frequency at a substantially constant level.

The clock pulse generator 17 having the configuration as described hereinabove can readily be realized, for example, by taking advantage of a known frequency synthesizing technique or the like.

As described hereinabove, the ion cyclotron resonance frequency of the particular ion is detected by the receiving electrodes of the high vacuum cell 2 and generated to the pre-amplifier 20 as high-frequency signal voltage. The pre-amplifier 20 is not required to amplify and transmit all the high-frequency signal voltage of all the ions on the basis of the whole components constituting the sample gas and it is satisfactory to use the narrow-band amplifier having response to the resonance signal corresponding to the particular ion.

As a consequence, this arrangement can offer the features as follows:

The resonance signals of the ions outside the object of measurement are blocked from entering into the amplifier system so that the restriction to the dynamic range of the high-frequency amplifier 21 and the A/D converter 23 is alleviated; and a signal-to-noise ratio (S/N) is enhanced because noises of an unnecessary band are rejected.

The high-frequency amplifier 21 receiving the output from the pre-amplifier 20 implements the mixed processing with the reference signal fo after amplification of the resonance signal and then generates the low-frequency signal of the difference frequency to the low-pass filter 22.

The low-pass filter 22 is adapted to eliminate the folding over signals caused to occur at the time of conversion by the A/D converter 23, and the cutoff frequency is set in advance to become lower by half times or less, comparing with the clock frequency of the A/D converter 23.

The resonance signal from which the band of the unnecessary frequency has been eliminated and which has been amplified to the signal level suitable for the A/D converter 23 is then converted into the digital signal by the A/D converter 23 and transmitted to the computer 27 via the high-speed interface 30, followed by storing in the storage 28 as time-region data. After the measurement has been made, the time-region data is subjected to Fourier conversion at a high speed by the computer 27, thereby converting the time-domain data into a frequency-domain data, that is, a mass spectrum.

It can be noted as a matter of course that the entire control over these operations is automatically executed on the basis of the control signals from the computer 27 via the interface 30.

The present invention is not restricted to the embodiments as described hereinabove and it can allow a variety of modifications within the scope of the gist of the invention.

For instance, when there are plural components to be measured, then the high-frequency sources for measurement and the amplifiers for amplifying the narrow-band signals may be added. This arrangement can be implemented with ease by taking advantage of a plug-in unit type.

Further, a single frequency synthesizer may be disposed, in place of plugging in the high-frequency source units corresponding to the respective components to be measured, so as to be shifted one after another during the period of time during which the ions are being excited.

It is to be noted that, although the permanent magnet is employed as the source of forming the static magnetic field in the aforesaid embodiment, the electric magnet can also be employed in place of the permanent magnet and it can demonstrate the similar technical effects.

INDUSTRIAL APPLICABILITY

The present invention having the configuration as described hereinabove in detail can offer the technical effects as follows:

(1) The components can be isolated from mixed gases at real time (in a second unit or less) in the process analysis. Hence, the analysis of the components, which otherwise requires a long period of time so far by process gas chromatography, can be carried out at real time. Further, there is no restriction upon the kind of components to be measured, and any component from, for example, a mixture of gases resulting from chemical plant, can be analyzed at real time.

(2) In the analysis of respiratory gas, such analysis including the analysis for separating nitrogen and carbon monoxide, the analysis for separating nitrous oxide and carbon dioxide as having rendered heretofore impossible by conventional analysis methods, can be executed at real time. The Fourier transform mass spectrometer according to the present invention can be utilized as a monitor at the general anesthesia of a patient, particularly by allowing the nitrous oxide to be separated from carbon dioxide at real time, thereby capable of executing determination of appropriately conditioned air, the clogging of air, diagnosis of shocks, and so on.

(3) In the analysis of evolved gases, the Fourier transfrom mass spectrometer can be utilized as a compact active-gas analyzing apparatus capable of executing the analysis of the elements structuring an ion for such a short period of time as only large-size mass analyzers can so far achieve the analysis.

(4) A short life gas, such as a nitrogen oxide, can be analyzed at the time of occurrence of the ion.

(5) In analysis for a long period of time, the mass spectrum can be detected accurately regardless of a variation in the static magnetic field. Hence, the present invention can achieve the accurate analysis for a long period of time as described in items (1) to (4) above.

We claim:

1. A Fourier transform mass spectrometer comprising ionizing a sample gas introduced into a high vacuum cell disposed in a static magnetic field to form an ion, applying a high frequency electric field caused to occur by applying high frequency to a pair of irradiating electrodes disposed in the high vacuum cell to the ion, inducing ion cyclotron resonance resulting from the ion of a particular component as the object of measurement, detecting the ion cyclotron resonance as a high-frequency decaying electric signal for decaying the high frequency, converting the resulting the high-frequency decaying electric signal to a digital signal as a time-domain signal, and converting the digital high-frequency decaying electric signal into a frequency-domain signal, characterized by a permanent magnet or an electric magnet for forming the static magnetic field, high-frequency transmitting means for reading a wave form of the digital high-frequency electric field stored in a memory by means of a clock pulse generated from a clock pulse generator and transmitting an analog wave form subjected to D/A conversion to said pair of the irradiating electrodes, and feedback means for detecting a drift for a long term of magnetic field to be applied as a variation in an ion cyclotron resonance frequency of the particular component and making reading frequency of a clock pulse variable in accordance with a deviation in the ion cyclotron resonance frequency, thereby holding a ratio of the static magnetic field to the frequency of the high-frequency electric field in a constant ratio.

2. A Fourier transform mass spectrometer characterized by:

a high vacuum cell for ionizing a sample gas introduced;

magnetic field generating means for forming a static magnetic field in the high vacuum cell;

a high-frequency source for providing a particular ion within the high vacuum cell for a high-frequency electric field having a plurality of fixed frequencies for causing ion cyclotron resonance;

detection means for detecting the ion cyclotron resonance formed in the high vacuum cell as a high-frequency decaying electric signal; and operation controlling means for controlling a ratio of the static magnetic field to the frequency in a constant ratio by converting the high-frequency decaying electric signal into a frequency-domain signal, determining a drift for a long term of the magnetic field to be applied by the magnetic field generating means as a variation in ion cyclotron resonance frequency of the particular ion, and subjecting a portion corresponding to the variation in the ion cyclotron resonance frequency to feedback to the high-frequency source.

3. A Fourier transform mass spectrometer as claimed in claim 2, wherein said high vacuum cell is a hexahedral or cubic cell comprising a pair of electrodes disposed so as to be perpendicular to the direction of a magnetic field generated by the magnetic field generating means, a pair of irradiating electrodes disposed so as to be parallel to the magnetic field and perpendicular to each other, and a pair of receiving electrodes.

4. A Fourier transform mass spectrometer as claimed in claim 2, wherein said high-frequency source comprises a clock pulse generator for generating a clock pulse having a predetermined cycle, a high-frequency generator and a high-frequency transmitter.

5. A Fourier transform mass spectrometer as claimed in claim 2, wherein said detection means contains a pre-amplifier for amplifying the ion cyclotron resonance frequency induced by the receiving electrodes of the high vacuum cell in a narrow band and a high-frequency amplifier for subjecting the ion cyclotron resonance frequency amplified in the narrow band and a reference signal of frequency fo to be entered separately to mixed processing, and converting into a low-frequency signal of a difference frequency between the resonance and the refference frequencies.

* * * * *